United States Patent Office 3,095,336
Patented June 25, 1963

3,095,336
HIGH STRENGTH CERAMIC COMPOSITIONS AND METHODS FOR PREPARING THE SAME
James M. Church, Tenafly, N.J., and Walter H. Greenberg, Syosset, N.Y., assignors to Riverside Plastics Corporation, Hicksville, N.Y., a corporation of New York
No Drawing. Filed Mar. 20, 1959, Ser. No. 800,635
3 Claims. (Cl. 154—2.2)

The present invention is directed towards high strength ceramic compositions and to methods for preparing the same, and more particularly to laminated ceramic structures possessing high strengths, and high resistances towards cleavage.

This invention has as an object the provision of ceramic compositions having high strength characteristics.

This invention has as another object the provision of ceramic compositions formed as laminated structures.

This invention has as a further object the provision of high strength ceramic compositions which may be shaped in a variety of forms.

This invention has as a still further object the provision of high strength ceramic materials which may be made relatively cheaply using readily available materials and relatively simple processing equipment.

This invention has as a still further object the provision of a laminated ceramic having a skeletal support structure.

This invention has as yet a further object the provision of a process for manufacturing novel ceramic compositions.

Other objects will appear hereinafter.

The ceramics of the present invention are formed from the impregnation of glass fabrics with a mixture comprising a resin and a ceramic filler, followed by the burning off of the resin and the subsequent fusion of the resulting ceramic-glass structure to form a rigid solid ceramic.

A wide variety of resins may be utilized in the subject invention. It is essential that such resins comprise thermosetting resins which are those resins which solidify or set on heating and cannot be remelted. Examples of suitable thermosetting resins include resins of the phenol-formaldehyde, urea-formaldehyde, epoxy resin (by which term is meant to include resins having an epoxide structure), polyester resins (which term is meant to include resins produced by the esterification of polybasic organic acids with polyhydric alcohols), silicone resins and related resin types having analogous properties. As will be readily understood by one having skill in the art, many of the aforesaid resins require the presence of curing agents and/or catalysts. For example, acidic or basic catalysts may be used with the phenol-formaldehyde and urea-formaldehyde resins, and peroxide catalysts may be used for the polyester and silicone resins. A curing agent should be utilized with the epoxy resins, and any of the amine acid anhydride or other types of curing agents may be utilized with the appropriate epoxy resins.

It is essential for the purposes of the present invention that the set resin be one which is gasified on being heated to a temperature which is appreciably below the temperature at which the ceramic filler becomes converted into a ceramic.

The ceramic filler of the present invention may comprise any one of the large variety of powdered oxide mixtures known to those skilled in the art which may be fused with glass at elevated temperatures to form a fused glass ceramic. Suitable oxides which may be used in the ceramic fillers of the compositions of the present invention comprise the oxides of silicon, aluminum, thorium, magnesium, calcium, barium, and other elements which go into the formation of ceramics. In addition to such oxides the ceramic fillers of the present invention may include other salts such as carbonates, silicates and phosphates. Since generally the ceramic fillers are derived from mineral matter, there will also be present traces of various substances which are found in minerals.

The materials of the present invention include glass fabrics. A wide variety of glass fabrics may be used and it is to be understood that the present invention comprehends glass fabrics of different yarn size, type of weave, and weight. Examples of suitable glass fabrics are those designated as 128/150, 164/225, and 181/150. A wide variety of surface treatments or finishes may be present on such glass fabrics including the Volan, Garan, NOL, or A & Y 1100 treatments. Other fiber fabrics having somewhat analogous properties to glass may be utilized in conjunction with the glass fabrics of the present invention, as for example woven asbestos, woven silica, and woven ceramic fibers such as the alumina and silica ceramic fiber designated "Fiberfrax" which is marketed by the Carborundum Company.

The glass fabric of the present invention should comprise a high melting glass which fuses with the ceramic filler at relatively elevated temperatures.

In addition to the glass fabric, the compositions of the present invention should include a minor amount of a low melting glass, such as an alkaline phosphate, which melts at about the temperature at which the resin is gasified.

The process of the present invention is as follows:

The resin and the ceramic filler are intimately mixed, as on a differential speed three roll pigment mill, with heat and/or a solvent being applied, if necessary, in order to obtain a sufficiently fluid mass to enable thorough intimate mixing. If the resin is one which requires a catalyst or curing agent, the same is added preferably at the conclusion of the mixing so as to assure a maximum life for the resin-filler mixture during its impregnation into the glass fabric.

In the final material the weight ratio of glass to ceramic filler (actually the two will be fused together) will be between 100 parts of glass to 30 parts of filler to 100 parts of glass to 140 parts of filler.

After the impregnation of the glass fabric for a proper add-on, the impregnated fabric is dried of any solvent which may have been used in the preparation of the mixture, and then is cut into the sizes desired for lamination. The separate plies of impregnated fabric are piled one above the other for the desired thickness of the laminate to be made therefrom.

After a short preheating period at temperatures below those to be used in the curing of the laminate, the pile of impregnated fabric plies is placed between polished metal plates, and the stack pressed between heated platens, as between the heated platens of a hydraulic press. The temperature and pressure will, of course, be dependent upon the recommended curing conditions for the particular resin used in the particular laminate being formed. However, generally between 250° F. to 350° F. and a pressure range of 100 to 500 pounds per square inch is utilized. The curing time range is generally between 20 to 60 minutes. The shape of the laminate may be regulated by the use of suitable forms, with the stack being cut to particular shapes, if necessary. The finished laminate is removed from the press after the resin has been cured and the edges of the laminate are trimmed for excess resin squeeze-out.

The so-formed mixed laminate is then heated in order to remove the resin by gasification. Such heating is preferably accomplished by slowly heating the laminate to a temperature of about 600° F. At about this temperature, the resin will generally begin to decompose as evidenced by the appearance of fumes and smoke. The heating should preferably be performed in a kiln, and a slow stream of air should be admitted to the kiln in order to aid in the removal of fumes as the resin is decomposed.

The temperature of the laminate should be maintained within the temperature range at which the resin decomposes, as within the temperature range of 500° F. to 800° F., until no further evidence of smoke is present, whereby it will be known that the resin has been completely burned out. Simultaneously with the removal of the resin the low temperature glass will fuse. In this manner the laminate will be maintained intact until the higher temperatures are reached wherein the fusion of the glass fabric to the ceramic filler is achieved. In this manner the plastic laminate dimensions may be retained during the gasification removal of the resin so that substantially similar or the same dimensions are obtained for the final structure as were present in the original laminate.

After the gasification of the resin, the temperature within the kiln is raised gradually up to the temperature range at which the glass is fused to the ceramic filler. Such temperature range is generally of the order of 2,000° F. to 2,600° F. When this temperature range is achieved, it is maintained for a heat-soak period which is sufficient to effect the fusion of the glass fabric to the ceramic filler particles. Generally, this heat-soak period is of the order of from one to two hours.

At the conclusion of the heat-soak period, the resultant ceramic structure is slowly cooled to room temperature within the kiln and set into a rigid solid mass. In the case of complex shapes, it may prove advisable to provide a support for these capable of withstanding high temperatures, in order that the shape may be maintained without excessive warpage at the high temperature heat treatment levels.

The following examples are to be deemed illustrative, it being understood, however, that this invention is not limited thereto:

*Example I*

An epoxy resin designated "Epi-Rez 510" and sold by Jones-Dabny Co. was mixed with the methyl derivative of four-endomethylenetetrahydrophthalic anhydride in the proportions of 100 to 80 parts by weight with or without the addition of a catalyst.

A ceramic filler mixture was formed separately from 60 parts by weight of alumina, 30 parts by weight of a ceramic mixture comprising the following approximate weight percentages: 65% PbO, 1% $Al_2O_3$, and 34% $SiO_2$, and 10 parts by weight monosodium phosphate. The empirical molecular formula for this ceramic filler mixture may be represented as: 0.294 $Na_2O$, 0.706 PbO, 0.477 $Al_2O_3$, 0.294 $P_2O_5$ and 1.370 $SiO_2$.

Equal parts by weight of the aforementioned epoxy resin and ceramic filler were then thoroughly mixed together on a three roll pigment mill at temperatures within the range of 70° F. to 100° F. for several minutes to assure a substantially homogeneous mixture, with the ceramic particles being wetted by the resin ingredients.

The resin-filler mixture was then impregnated into 182/150/112 glass cloth for a 150 weight percent add-on of the mixture, based upon the weight of the glass cloth. The so-impregnated glass cloth was then cut into 12 inch by 12 inch squares, and sixteen of these squares were stacked upon each other between polished steel plates for laminating. The stack was first preheated in an oven at 200° F. for a period of 10 to 15 minutes, and then placed between the heated platens of a hydraulic press. The temperature of the heated platens was set at 275° F. A pressure of 200 pounds per square inch was then applied to the stack of impregnated glass cloth for 40 minutes with the temperature being maintained at 275° F. The resultant cured laminate comprising a 12 inch by 12 inch by one-quarter inch structure was taken from the press while still hot. Upon the cooling of the laminate, its edges were trimmed. During the lamination, some of the resin was lost in squeeze-out. As a result, the resin-filler-glass laminate had approximately the following composition: 25 weight percent of resin, 30 weight percent of filler, and 45 weight percent of glass cloth. This laminate had a flexural modulus of 619,000 pounds per square inch, a flexural strength of 43,000 pounds per square inch, and a hardness determined on the Rockwell "M" scale of 106.

The plastic laminate was converted into a ceramic structure as follows:

The plastic laminate was slowly heated to a temperature of between 600° F. to 800° F. in a kiln, while admitting a slow stream of air for the burn-out of the resin. The burn-out of the resin was evidenced by smoke. When all of the resin had been volatilized, as evidenced by the termination of the smoke, the temperature of the laminate was then gradually increased to 2000° F. and maintained at this temperature for two hours so as to render a heat-soak treatment. At the close of the two hour heat-soak treatment, the laminate was cooled slowly to room temperature. The resultant ceramic structure assumed a hard rigid solid mass having similar dimensions to that of the original plastic laminate. This hard rigid solid mass had a modulus of rupture of 4,520 pounds per square inch and was capable of absorbing 0.57 weight percent of water.

*Example II*

An epoxy resin designated "Epi-Rez 510" and sold by Jones-Dabny Co. was mixed with an amine type hardener designated "Curing Agent Z," which is sold by the Shell Chemical Corporation, in the ratio of 100 to 20 parts by weight. Equal parts by weight of this resin-hardener combination were mixed with a ceramic filler consisting of 60 weight percent of alumina, 30 weight percent of a mixture of ceramic oxides designated "Pemco P-404" sold by Porcelain Enamel & Mfg. Co., and 10 weight percent of monosodium phosphate. The empirical molecular formula of this ceramic filler may be represented as: 0.297 $Na_2O$, 0.194 $K_2O$, 0.331 CaO, 0.178 BaO, 3.158 $Al_2O_3$, 0.184 $P_2O_5$, and 1.082 $SiO_2$.

The completely mixed mixture of resin-hardener and ceramic filler was impregnated into 128/150 Volan A glass cloth for a 180% add-on of the mixture, based upon the weight of the glass cloth. The so-impregnated glass cloth was then cut into 12" x 12" squares and thirty of these squares were stacked upon each other between polished steel plates for laminating. The stack was first preheated in an oven at 200° F. for a period of ten to fifteen minutes, and then placed between the heated platens of a hydraulic press. The temperature of the heated platens was set at 275° F. A pressure of 200 pounds per square inch was then applied to the stack of impregnated glass cloth for forty minutes with the temperature being maintained at 275° F. The resultant cured laminate comprising a 12" x 12" x ¼ inch structure was taken from the press while still hot. Upon the cooling of the laminate, its edges were trimmed. During the lamination, some of the resin was lost in squeeze-out. As a result, the resin-filler-glass laminate had approximately the following composition: 27 weight percent of resin, 35 weight percent of filler, and 38 weight percent of glass cloth. This laminate had a flexural modulus of 484,000 pounds per square inch, a flexural strength of 37,500 pounds per square inch, and a Rockwell hardness on the "M" scale of 99.

The laminate was converted into a ceramic structure as follows:

The laminate was slowly heated to a temperature of 600° F. to 800° F. in a kiln, while admitting a slow stream of air for the burn-out of the organic resin. When all of the resin had been volatilized, the temperature was increased to 2,200° F. and maintained at this temperature for one hour for a heat-soak treatment. Upon cooling slowly to room temperature, the resulting ceramic structure assumed a hard rigid solid mass of similar dimensions as the original plastic laminate. This rigid ceramic structure had a modulus of rupture of 3,524 pounds per square inch and was capable of absorbing 0.23 weight percent of water.

*Example III*

The identical epoxy resin, hardener, and ceramic filler employed in Example II was utilized except that the ratio of resin-hardener to ceramic filler was varied from the 50 parts by weight to 50 parts by weight ratio of Example II to a weight ratio of 60 parts by weight of resin-hardener to 40 parts by weight of ceramic filler. The thoroughly mixed mixture of resin-hardener and ceramic filler was impregnated into a 181/225/112 glass cloth for a 140 weight percent add-on of the mixture, based upon the weight of the glass cloth. The procedure detailed in Example II was followed to produce a 12" x 12" x 1/4" structure, such structure having approximately the following composition: 31 weight percent of resin, 25 weight percent of ceramic and low melting glass filler, and 44 weight percent of glass cloth. This laminate had a flexural modulus of 493,000 pounds per square inch, a flexural strength of 47,800 pounds per square inch, and a hardness measured on the Rockwell "M" scale of 113.

The conversion of the plastic laminate into a ceramic structure was achieved by the process set forth in Example II except that in place of a heat-soak period of 2,200° F. for one hour, a heat-soak period of 2,200° F. of thirty minutes was utilized. The resultant hard rigid ceramic structure had a modulus of rupture of 3,981 pounds per square inch and an obsorbtivity of 1.31 weight percent of water.

*Example IV*

An epoxy resin designated "Epi-Rez 510" and sold by Jones-Dabny Co. was mixed with an amine type hardener designated "Curing Agent Z," sold by Shell Chemical Corporation, in the ratio of 100 parts by weight of resin to 20 parts by weight of hardener.

This mixture was intimately mixed with a ceramic filler consisting of 60 weight percent of alumina, 30 weight percent of an igneous rock designated "Nepheline Syenite (A-400)," such igneous rock being composed mainly of feldspar and nephelite, and being high in alumina and quartz-free, and 10 weight percent of mono-sodium phosphate. Such ceramic filler had an empirical molecular formula which may be represented as: 0.814 $Na_2O$, 0.143 $K_2O$, 0.036 CaO, 0.007 BaO, 6.374 $Al_2O_3$, 0.350 $P_2O_5$, and 2.904 $SiO_2$. The weight percentage ratio of resin-hardener to ceramic filler was 40 parts by weight to 60 parts by weight.

The thoroughly mixed resin-hardener and filler mixture was impregnated into a 164/225 Garan glass cloth for a 155 weight percent add-on of the mixture, based upon the weight of the glass cloth. The so-impregnated glass cloth was then cut into twelve 12" x 12" squares, and twelve of these squares were stacked upon each other between polished steel plates for laminating. The stack was first preheated in an oven at 200° F. for a period of ten to fifteen minutes, and then placed between the heated platens of a hydraulic press. The temperature of the heated platens was set at 280° F. A pressure of 200 pounds per square inch was then applied to the stack of impregnated glass cloth for forty minutes with the temperature being maintained at 280° F. The resultant cured laminate comprising a 12" x 12" x 1/4" structure was taken from the press while still hot. Upon the cooling of the laminate, its edges were trimmed. During the lamination, some of the resin was lost in squeeze-out. As a result, the resin-filler-glass laminate had approximately the following composition: 24 weight percent of resin, 36 weight percent of filler, and 40 weight percent of glass cloth. This laminate had a flexural modulus of 538,000 pounds per square inch, a flexural strength of 48,700 pounds per square inch, and a hardness measured on the Rockwell "M" scale of 99.

The conversion of the above plastic laminate into a ceramic structure was achieved by the procedure set forth in Example II except that a heat-soak period of 2,250° F. for one hour was utilized. The resultant ceramic structure had a modulus of rupture of 4,910 pounds per square inch and an obsorbtivity of 0.51 weight percent of water.

*Example V*

The epoxy resin-hardener composition utilized in Example IV was utilized in this example. However, the ceramic filler utilized in this example consisted of 65 weight percent of alumina, 25 weight percent of Nepheline Syenite (A-400), and 10 weight percent of monolithium phosphate. Equal parts by weight of the resin-hardener mixture and the ceramic filler were intimately mixed together on a three-roll pigment mill utilizing the procedure set forth in Example I.

The mixture of resin-hardener and ceramic filler was then impregnated into a 182/150/112 glass cloth for a 150 weight percent add-on of the mixture, based upon the weight of the glass cloth.

The procedure set forth in Example I was followed to form both the plastic laminate, and then the hard rigid ceramic structure. The plastic laminate had a flexural modulus of 533,000 pounds per square inch, a flexural strength of 33,900 pounds per square inch, and a hardness measured on the Rockwell "M" scale of 115. The ceramic structure had a modulus of rupture of 3,988 pounds per square inch and was capable of absorbing 1.67 weight percent of water.

*Example VI*

A phenol-formaldehyde thermosetting resin designated "Plaskon V-204," sold by the Plaskon Division of Libbey-Owens-Ford Glass Company, was compounded with a ceramic filler comprising 60 weight percent of alumina, 30 weight percent of a mixture of ceramic oxides designated "Pemco (P-941)," sold by Porcelain Enamel & Mfg. Co., and 10 weight percent of monosodium phosphate, and the resultant mixture was thoroughly mixed together on a three-roll pigment mill at temperatures within the range 70° F. to 100° F. for several minutes to assure a substantially homogenous mixture, with the ceramic particles being wetted by the resin. The empirical molecular formula of the ceramic filler prior to mixture with the resin may be represented as: 0.208 $Na_2O$, 0.103 CaO, 0.689 MgO, 3.718 $Al_2O_3$, 0.208 $P_2O_5$, and 1.750 $SiO_2$. The mixture of resin to ceramic filler was in equal proportions on the dry resin basis.

The resin-filler mixture was impregnated into 181/225/A-1100 glass cloth for a 180 weight percent add-on of the mixture, based upon the weight of the glass cloth. The so-impregnated glass cloth was then cut into 12" x 12" squares, and twenty of these squares were stacked upon each other between polished steel plates for laminating. The stack was first preheated in an oven at a temperature of 200° F. for a period of ten to fifteen minutes, and then placed between the heated platens of a hydraulic press. The temperature of the heated platens was set at 260° F. A pressure of 500 pounds per square inch was then applied to the stack of impregnated glass cloth for sixty minutes with the temperature being maintained at 275° F. The resultant cured laminate comprising a 12" x 12" x 1/4" structure was taken from the press while still hot. Upon the cooling of the laminate, its edges were trimmed. During the lamination, some of the resin was lost in squeeze-out. As a result, the resin-filler-glass laminate had approximately the following composition: 32 weight percent of resin, 32 weight percent of filler, and 36 weight percent of glass cloth. This laminate had a flexural modulus of 517,000 pounds per square inch, a flexural strength of 22,200 pounds per square inch, and a hardness measured on the Rockwell scale "M" of 105.

The conversion of the plastic laminate into the hard rigid solid ceramic structure was effected by the procedure set forth in Example I, namely burning out the resin and firing at 2000° F. The ceramic structure had a modulus of rupture of 6,005 pounds per square inch and was capable of absorbing 0.46 weight percent of water.

*Example VII*

A polyester resin which had been modified with diallyl phthalate and which is designated as "Laminac 4202," and sold by American Cyanamid Co., was mixed on an equal parts by weight basis with a ceramic filler comprising seventy parts by weight of alumina A-14, twenty parts by weight of a ceramic mixture comprising the following approximate weight percentages; 65% PbO, 1% $Al_2O_3$, and 34% $SiO_2$, and ten parts by weight of monobasic sodium phosphate.

The aforesaid mixture was thoroughly mixed together on a three-roll pigment mill at temperatures within the range 70° F. to 100° F. for several minutes to assure a substantially homogenous mixture, with the ceramic particles being wetted by the resin ingredients.

The resin-filler mixture was then impregnated into 182/150/112 glass cloth for a 140 weight percent add-on of the mixture, based upon the weight of the glass cloth. The so-impregnated glass cloth was then cut into twelve inch by twelve inch squares, and sixteen of these squares were stacked upon each other between polished steel plates for laminating. The stack was first preheated in an oven at 200° F. for a period of ten to fifteen minutes, and then placed between the heated platens of a hydraulic press. The temperature of the heated platens was set at 275° F. A pressure of 275 pounds per square inch was then applied to the stack of impregnated glass cloth for forty minutes with the temperature being maintained at 275° F. After the lamination, the resin-filler-glass laminate had approximately the following composition: 28 weight percent of resin, 30 weight percent of filler, and 42 weight percent of glass cloth. This laminate had a flexural modulus of 570,000 pounds per square inch, a flexural strength of 23,300 pounds per square inch, and a hardness determined on the Rockwell "M" scale of 113.

The plastic laminate was converted into a ceramic structure as follows:

The plastic laminate was slowly heated to a temperature of between 600° F. to 800° F. in a kiln, while admitting a slow stream of air for the burn-out of the resin. The burn-out of the resin was evidenced by smoke. When all of the resin had been volatilized, as evidenced by the termination of the smoke, the temperature of the laminate was then gradually increased to 2,100° F., and maintained at this temperature for two hours so as to render a heat-soak treatment. At the close of the two hour heat-soak treatment, the laminate was cooled slowly to room temperature. The resultant ceramic structure assumed a hard, rigid, solid mass having similar dimensions to that of the original plastic laminate. This hard, rigid, solid mass had a modulus of rupture of 5,345 pounds per square inch and was capable of absorbing 0.53 weight percent of water.

The ceramic structures of the present invention may be shaped in any desired form, and possess, as above-indicated, great structural strength. The strength may be oriented, since the skeletal structure of glass cloth produces a strength oriented ceramic. Materials may be added to the outer portion of any ceramic structure of the present invention to achieve particular skin properties. Thus, as will be evident to one having skill in the art, compounds may be added to the outermost lamina to produce a ceramic having a very hard skin.

The present invention may be embodied in other specific forms without departing from the spirit or essential attributes thereof and, acordingly, reference should be made to the appended claims, rather than to the foregoing specification as indicating the scope of the invention.

We claim:

1. A rigid high strength material consisting essentially of a plurality of superposed layers of fused glass fabric formed from a relatively high melting glass which melts at a temperature of about 2000° F. to 2600° F., a fused relatively low melting glass consisting of a monovalent alkali metal phosphate which melts at a temperature of about 600° F. to 800° F., and a ceramic filler in which the weight ratio of glass to ceramic filler is between 100 parts by weight of glass to 30 parts by weight of ceramic filler to 100 parts by weight of glass to 140 parts by weight of ceramic filler, with said fused relatively low melting glass being homogeneously fused to said ceramic filler, and with said fused relatively low melting glass and ceramic filler extending through the interstices of said layers of fused glass fabric so as to bind said layers of fused glass fabric together, and with said fused high melting glass fibers of the glass fabric fused to said homogeneous fusion of the fused relatively low melting glass and ceramic filler.

2. A material in accordance with claim 1 in which the ceramic filler is a ceramic filler selected from the group consisting of the fusible oxides, carbonates, silicates, and phosphates of silicon, aluminum, thorium, magnesium, calcium, barium, and mixtures of the aforesaid substances.

3. A process for forming a rigid high strength ceramic material comprising homogeneously blending a fluid mixture of a gasifiable thermosetting resin which is gasified at a temperature of about 600° F. to 800° F., a low melting glass consisting of a monovalent alkali metal phosphate which melts at a temperature of about 600° F. to 800° F., and a ceramic filler, applying said fluid homogeneous mixture to a relatively high melting glass fabric member of a glass which melts at a temperature of about 2000° F. to 2600° F. so that said mixture is forced into the interstices in said glass fabric member, superposing a plurality of said impregnated high melting glass fabric members, curing said thermosetting resin to form a laminate of said superposed impregnated glass fabric members, heating said laminate to a temperature of between about 600° F. to 800° F. so as to gasify said resin and to fuse said low melting glass, then heating said low melting glass, then heating said laminate to a temperature of between 2000° F. to 2600° F. to fuse the high melting glass and ceramic filler, and then cooling said fused material to form a rigid high strength ceramic material.

References Cited in the file of this patent

UNITED STATES PATENTS

| | | |
|---|---|---|
| 2,076,078 | French | Apr. 6, 1937 |
| 2,610,957 | Steinman et al. | Sept. 16, 1952 |
| 2,771,969 | Brownlow | Nov. 27, 1956 |

FOREIGN PATENTS

| | | |
|---|---|---|
| 208,300 | Australia | May 2, 1957 |